F. N. BARD.
COMPOSITE NON-METALLIC GASKET.
APPLICATION FILED AUG. 30, 1919.
1,346,523.
Patented July 13, 1920.
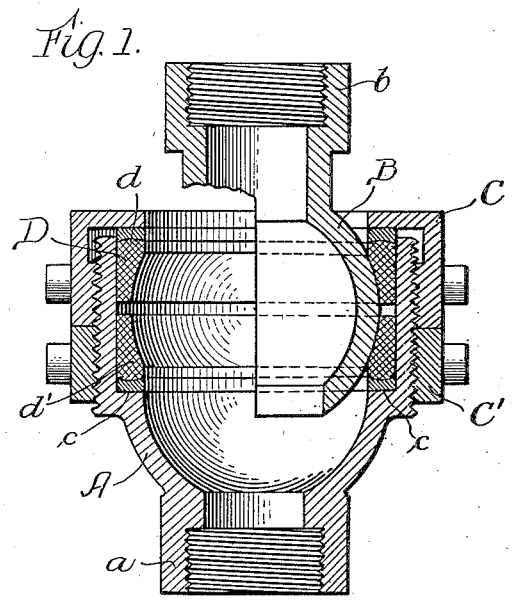
Fig. 1.
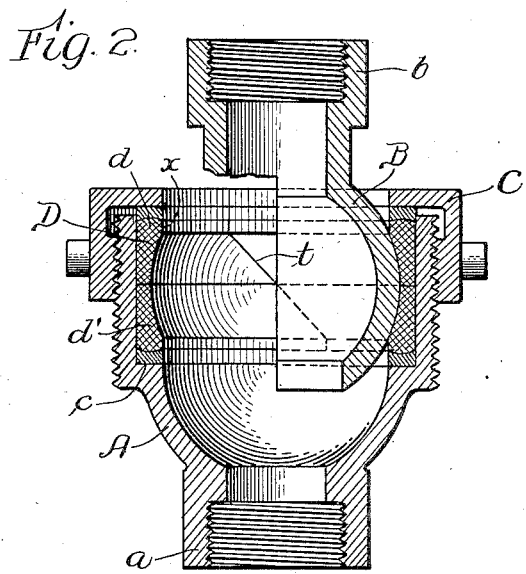
Fig. 2.
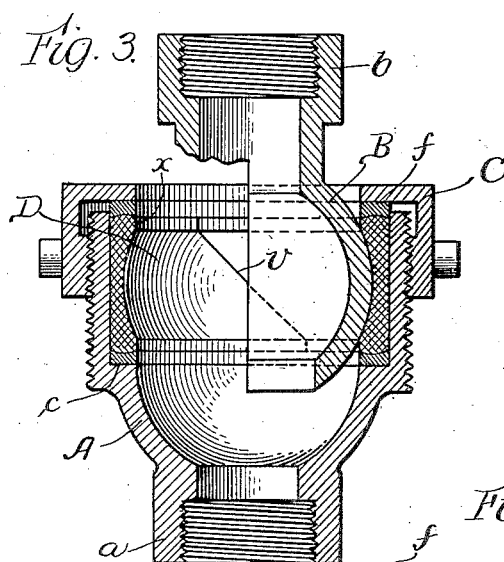
Fig. 3.
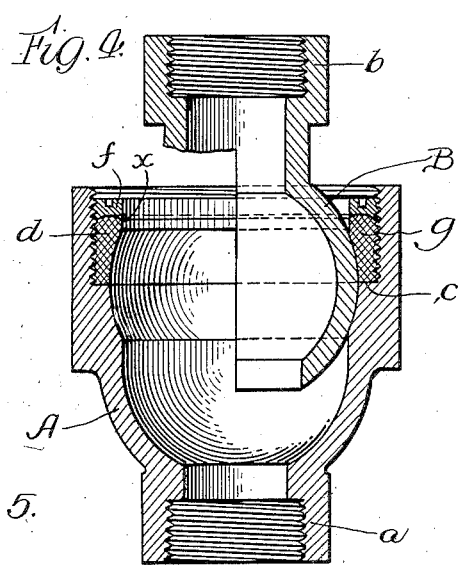
Fig. 4.
Fig. 5.
Witness:
Geo. C. Davison
Inventor:
Francis Norwood Bard
by attorney
Paul Carpenter

UNITED STATES PATENT OFFICE.

FRANCIS NORWOOD BARD, OF HIGHLAND PARK, ILLINOIS.

COMPOSITE NON-METALLIC GASKET.

1,346,523.  Specification of Letters Patent.  Patented July 13, 1920.

Application filed August 30, 1919. Serial No. 320,752.

*To all whom it may concern:*

Be it known that I, FRANCIS NORWOOD BARD, a citizen of the United States, and a resident of the city of Highland Park, in the county of Lake and State of Illinois, have invented certain new and useful Improvements in Composite Non-Metallic Gaskets, of which the following is a specification.

My present invention relates in general to gasketing material and more particularly molded gaskets and has special reference to the provision of an improved type of molded gasket, peculiarly adapted for use in connection with flexible joints.

Flexible joints, such as those in which gaskets embodying my present improvements find one of their largest fields of utility, are commonly used as members in the connection of the air and steam pipe lines between railway train elements, as for example between the locomotive and tender or between cars.

Such flexible fluid connections must not only be fluid tight in order to avoid wastage of material, but also in order to avoid interference with the operation of the train since, for example, a leak in the train pipe of the air-brake system if long enough continued would lead to uncalled for application of the brakes.

In practice I have found that metallic gaskets are unsatisfactory for a number of reasons, among which may be mentioned, difficulty in keeping them sufficiently tight to prevent leakage, a tendency to score or otherwise cut the metallic joint members (which renders them markedly unsuitable in cases such as ball-and-socket joints where the ball member has to be highly finished in order to maintain a tight joint,) an active corrosion when oxidizable metals are employed and an inherent tendency to stick or freeze when non-corrosive metals, such as bronzes and brasses, are employed in the manufacture of the joints.

On the other hand, such non-metallic gaskets as are known to me have proven unsatisfactory in service owing to the fact that if they are made of metal soft enough to make a satisfactorily tight joint, there is a marked tendency toward distortion upon the application of pressure sufficient to keep the joint tight, this even to the extent of lateral spreading and bulging of the packing material, whereas if they are made of material sufficiently rigid to resist such tendency to distortion, not only are the packing qualities, as such, reduced, but the gaskets easily become chipped, broken or otherwise leaky and inefficient in service.

I am aware that it has been proposed to minimize some of the objections above referred to by providing a gasket having a relatively softer wearing body with a relatively harder metallic facing at certain points, but I have found that while the employment of such facings may properly be considered to represent a material step in advance in the art, they are still open to all of the objections of metal as such.

Moreover, they are subject to further criticism in this that it is found in practice that such metallic facings become loosened from the gasket wearing body proper owing to the fact that no true union can be obtained between the non-metallic gasket body and the metallic facing.

Further, it is not practicable, in manufacturing procedure, to produce such metallic facings in all of the different sizes desirable to meet the varying conditions of service owing to the fact that such facings have to be made by complex and expensive machinery and processes.

The primary objects of my invention therefore are the provision of a composite non-metallic gasket which will present all of the advantages of the metallic types, the non-metallic types and the composite types, and generally to provide a gasket capable of making and maintaining a tight and at the same time a durable joint, together with such further objects as may hereinafter appear.

In attaining the objects referred to and certain additional benefits and advantages to be pointed out below, I have provided a construction, certain embodiments of which are disclosed in the accompanying drawing wherein—

Figure 1 is a longitudinal section of a ball-and-socket joint including gaskets embodying my present improvements in their preferred form;

Figs. 2, 3 and 4 are further views of such ball-and-socket joint, including different forms of gaskets embodying my present invention; and Fig. 5 is a view of still another form of my improved gasket.

On inspection of the drawings, it will be clear that in each of Figs. 1 to 4, one half of the socket of the ball member of the joint is cut away to prevent it from obscuring the view of certain features which it is desired to disclose.

Similarly, in each of the said figures of the drawing, I have for convenience of illustration of the use of my improved form of gasket, shown a socket member A having a suitable terminal $a$ for coupling it to a pipe, the opposite end being bell-mouthed to provide a socket for the reception of the ball member B, which has a terminal $b$ by means of which it may be coupled to another pipe.

The socket member A has formed within it an annular shoulder $c$ which forms a seat for a gasket D, and the socket member A is externally threaded for engagement with a cap member C which presses against the gasket D and holds it in contact with the ball B.

When desired, a lock-nut C' may be employed for holding the cap C in predetermined relation to the socket A.

The inner or wearing surface of the annular gasket conforms, of course, closely to the contour of the ball B with which it is associated and the external surface is, of course, of a contour to conform with the socket formed on the interior of the socket member A, between the shoulder $c$ and the cap C, and here shown as cylindrical.

It will be apparent further on inspection of Fig. 1 that the two coöperating halves of the gasket $d$, $d'$ here shown, being homologous, in case of unequal wear may be readily reversed, or if one of them is still capable of efficient service, the one finally worn out may be replaced.

While the gasket D may be made either in two integral annular opposed portions such as $d$, $d'$ as shown in Fig. 1, similarly opposed members may be diagonally split as indicated at $t$ in Fig. 2, so as to form either a pair of split rings or a plurality of segments, or but a single gasket such as is indicated at D in Fig. 3, and at $d$ in Fig. 4, may be used, the gasket D of Fig. 3 being diagonally split as indicated at $v$ in order to permit it to be placed in position around the ball B.

When the gasket members are split, as indicated in Figs. 2, 3 and 4, if they are split at all, they are preferably split in at least two places so as to divide them into separable segments not greater than a half-circle each, in order that they may be implaced or replaced upon the removal of the cap C without at all times necessitating that the pipes connected to the joint at $a$ and $b$ be uncoupled therefrom.

The outer edge of the gasket member is preferably squared as indicated at $x$ to afford a cylindrical extension beyond the concave inner wearing surface of the gasket because this renders possible a material augmentation of the life of the gasket without any variation of its action upon the ball, since the wear may extend through to the transverse outer surface of the gasket acted upon by the cap C without such cap bearing directly upon the ball B and without the gasket varying its contact with such ball.

The gasket arrangements shown in the several figures of the drawing will, it is clear, constitute a non-metallic separation and packing between the inner wall of the cap-carrying socket A and the ball B to prevent not only leakage therebetween but abrasive contact of the relatively movable surfaces of such two metallic members of the flexible joint, thus attaining the two crucial objects of my invention, a tight joint and a durable joint.

While it is thought that the arrangements of gaskets in the several forms of joints illustrated in the accompanying drawing will be so obvious to those skilled in the art as not to require further particularized description, it may be pointed out first that while I consider the arrangement of Fig. 1 structurally preferable, the alternatives shown in Figs. 2, 3 and 4 may meet special conditions, such as in cases wherein there is unusual wear on some particular part of the joint for which compensation may be made by forming the gasket in a number of parts as shown in Fig. 2, or wherein the gasket as an entirety has to be frequently replaced, as illustrated in Fig. 3, or wherein the mechanical pressure on the gasket is practically all in the one direction, as illustrated in Fig. 4, in which the pipe may be considered as under tension and the gasket under compression.

In carrying out my invention, I have found it desirable to form the outer part or parts of the gasket members, that is those which contact with the cap C or the shoulder $c$ or have any tendency toward lateral distortion, whether toward the ball B or toward overlapping the inner edge of the opening in the cap C or outer edge of the bell-mouth of the cap carrying socket A, from such non-metallic material as "bakelite" or "red fiber" which on the one hand is free from any tendency to seize metallic surfaces, to flow, to chip, or to break down, under pressure or to expand or to contract upon change of temperature, and on the other hand may not only be molded to exact dimensions but also is susceptible of forming a mechanically perfect joint with a suitable non-metallic packing or gasketing substance such as the composition of rubber and asbestos, or other suitable resistant fibrous material, which I preferably employ in forming the wearing surface of the gasket, (that part of the surface thereof which contacts with the ball B) and which may not only be molded to precise dimensions but which may be relied upon to conform closely to the contour of the ball without either seizing the ball or permitting the passage of fluid around the ball and thence to the atmosphere.

A further desideratum is attained by the employment of the composite gasket structure just described in this that when the ball B in service has worn the gasket down to a point where the backing of the gasket is exposed to contact with the ball B, such backing being relatively softer than the ball B has no tendency toward abrasion of the ball B.

In practice, the backing $f$ of the gasket may be formed, and then the wearing surface $g$ united thereto by heat and pressure, when forming a gasket such as is shown in Fig. 1, or the operation may be continued until the wearing surface $g$ is given the desired contour and a second backing $f'$ united thereto, in forming a gasket such as is illustrated in Fig. 3.

While as suggested, I deem the construction shown in Fig. 1 the preferable one, I do not confine myself to the forms either of gasket or of backing there shown, the essential element being a composite non-metallic gasket structure disclosed in this specification.

Other forms of backing such as that shown in Fig. 5 may be employed by me on such occasions as the circumstances may require, as, for example, where a backing of great strength but of relatively large volume of wearing face is demanded by the proposed service of the gasket.

Having thus described my invention and illustrated its use, what I claim as new and desire to secure by Letters Patent is:

1. A composite non-metallic gasket, comprising, in combination, a relatively softer wearing surface adapted to conform to a seat and a relatively harder and rigid non-metallic facing united thereto to prevent distortion thereof.

2. In a stuffing box for two relatively movable members a composite gasket structure comprising, in combination, a relatively softer wearing surface adapted to conform to the surface of one of said two relatively movable members, and a relatively harder facing united to said wearing surface to prevent distortion thereof.

3. A composite gasket for a stuffing box between two members comprising, in combination, a relatively softer wearing surface adapted to conform to the surface of one of said members, and a relatively harder facing so united to said wearing surface as to prevent distortion thereof in a direction substantially co-axial with the axis of the stuffing box.

4. A composite non-metallic gasket comprising, in combination, a relatively harder and more rigid facing and a relatively softer wearing surface adapted to conform to a seat, the facing and wearing surface being united by pressure.

5. A composite non-metallic gasket comprising, in combination, a relatively harder and more rigid facing and a relatively softer wearing surface adapted to conform to a seat, said wearing surface being molded under pressure and united to the facing during the molding operation.

6. A composite non-metallic gasket comprising, in combination, a molded facing formed of a relatively harder and more rigid material and a molded wearing surface adapted to conform to a seat and formed of relatively softer material, the said wearing surface being united to the said facing during the molding operation.

7. A composite non-metallic gasket comprising, in combination, oppositely disposed facings formed of relatively harder and more rigid material and a wearing surface adapted to conform to a seat disposed between said facings and united thereto by pressure.

8. A composite non-metallic gasket comprising, in combination, oppositely disposed facings formed of relatively harder and more rigid material and a molded wearing surface adapted to conform to a seat disposed between said facings and united thereto during the molding operation.

9. A composite non-metallic gasket comprising, in combination, oppositely disposed molded facings formed of relatively harder and more rigid material, and a molded wearing surface adapted to conform to a seat disposed between said facings and united thereto by pressure.

10. A composite non-metallic gasket comprising, in combination, oppositely disposed molded facings formed of relatively harder and more rigid material, and a molded wearing surface adapted to conform to a seat disposed between said facings and united thereto during the molding operation.

11. A composite non-metallic gasket comprising, in combination, a relatively softer wearing surface formed of a mixture of asbestos and rubber and a relatively harder and more rigid facing formed of non-metallic material and united to the wearing surface by pressure.

12. A composite non-metallic gasket comprising, in combination, a relatively softer molded wearing surface formed of a mixture of asbestos and rubber and a relatively harder and more rigid facing formed of non-metallic material, the wearing surface and the facing being united during the molding operation.

13. The combination, with a flexible joint including a casing, a cap, and a ball disposed between said casing and cap, of a composite gasket structure having a body portion formed of relatively softer non-metallic wearing material and provided with an inner curved wearing face adapted to conform to the ball and being interposed between the ball, and the casing and the cap, the ball engaging said curved face of the body portion, and the casing and cap engaging the outer surfaces of the gasket structure, one of said last mentioned surfaces being provided with a facing formed of relatively harder and more rigid non-metallic material and acting to prevent distortion of the gasket when the latter is subjected to pressure between said ball and cap or between said ball and socket.

14. The combination, with a flexible joint including a casing, a cap, and a ball disposed between said casing and cap, of a composite gasket structure having a body portion formed of relatively softer non-metallic wearing material and provided with an inner curved wearing face adapted to conform to the ball and being interposed between the ball, and the casing and the cap, the ball engaging said curved face of the body portion, and the casing and cap engaging the outer surfaces of the gasket structure, one of said last mentioned surfaces being provided with a facing formed of relatively harder and more rigid non-metallic material united to said wearing face and acting to prevent distortion of the gasket when the latter is subjected to pressure between said ball and cap or between said ball and socket.

15. The combination, with a variable joint including a casing, a cap, and a member disposed between said casing and cap movable relatively thereto, of a composite gasket structure having a body portion formed of relatively softer non-metallic wearing material and provided with an inner wearing face adapted to conform to the said relatively movable member and being interposed between it and the casing and the cap, said inner face of the body portion pressing against said relatively movable member, and the casing and cap engaging the outer surfaces of the gasket structure, one of said last mentioned surfaces being provided with a facing formed of relatively harder and more rigid non-metallic material united to said wearing face and acting to prevent distortion of the gasket when the latter is subjected to pressure between said cap and socket.

In testimony whereof I have hereunto signed my name in the presence of the two subscribed witnesses.

FRANCIS NORWOOD BARD.

Witnesses:
 PAUL CARPENTER,
 RANDOLPH S. BLACKMAN.